United States Patent [19]
Kunze

[11] Patent Number: 5,791,557
[45] Date of Patent: Aug. 11, 1998

[54] THERMOSTATIC VALVE

[75] Inventor: Jürgen Kunze, Rutesheim, Germany

[73] Assignee: Behr Thermot-tronik GmbH & Co., Kornwestheim, Germany

[21] Appl. No.: 841,405

[22] Filed: Apr. 30, 1997

[30] Foreign Application Priority Data

Nov. 12, 1996 [DE] Germany ............... 296 19 609.6

[51] Int. Cl.$^6$ ............................................. G05D 23/12
[52] U.S. Cl. ............................................. 236/345; 236/93 A
[58] Field of Search .................. 236/34.5, 34, 93 R, 236/93 A, 99 K, 100

[56] References Cited

U.S. PATENT DOCUMENTS

| | | | |
|---|---|---|---|
| 2,584,877 | 2/1952 | Hoffman et al. | 236/34.5 |
| 3,506,192 | 4/1970 | Otto | 236/34.5 |
| 3,913,831 | 10/1975 | Talak | 236/34.5 |
| 4,190,198 | 2/1980 | Casuga et al. | 236/34.5 |
| 4,536,346 | 8/1985 | Duprez | 236/34.5 |
| 5,228,618 | 7/1993 | Afshar | 236/34.5 |

FOREIGN PATENT DOCUMENTS

| | | |
|---|---|---|
| 1940755 | 6/1966 | Germany. |
| 4135842C1 | 4/1993 | Germany. |
| 19504677A1 | 8/1995 | Germany. |
| 19538285A1 | 8/1996 | Germany. |

OTHER PUBLICATIONS

Search Report Apr. 25, 1997 Germany.

*Primary Examiner*—William E. Tapolcai
*Attorney, Agent, or Firm*—Evenson, McKeown, Edwards & Lenahan, P.L.L.C.

[57] ABSTRACT

A thermostatic valve includes a valve housing and a preassembled construction unit insertable into the valve housing to form a complete assembly. The valve housing is stepped with a widest section closest to an insertion opening. The preassembled construction unit includes a thermostatic working element with restoring spring and movable valve elements.

25 Claims, 1 Drawing Sheet

THERMOSTATIC VALVE

BACKGROUND AND SUMMARY OF THE INVENTION

This application claims the priority of German application number 296 19 609.6 filed in Germany on Nov. 12, 1996, the disclosure of which is expressly incorporated by reference herein.

The invention relates to a thermostatic valve having a thermostatic working element, having an inflow valve arranged in an inflow and having a bypass valve arranged in a bypass to a return flow.

It is an object of the invention to provide a thermostatic valve of the initially mentioned type which has a simple construction, has only small structural dimensions and is particularly advantageously suitable for controlling the oil temperature of an automatic transmission of a motor vehicle.

This object is achieved in that a preassembled constructional unit is provided which can be inserted into a valve housing and which contains the thermostatic working element, including the restoring spring and the movable valve elements.

This constructional unit has a simple construction and requires only little space. Since the constructional unit already contains all operating elements, this constructional unit can be inserted into the adapted valve housing without the occurrence of mounting errors. Also unskilled workers who have no knowledge concerning the operation of a thermostatic valve can therefore completely mount the thermostatic valve and no mounting errors have to be expected.

As a development of the invention, it is provided that the constructional unit can be inserted into a chamber of the valve housing which is open on one side, in which case the chamber walls are provided with essentially mutually opposite inlets and outlets for an inflow and a return flow between which a bypass is situated in which a housing of the thermostatic working element is arranged and which can be blocked by means of the bypass valve with respect to the return flow and by means of the inflow valve with respect to the outlet of the inflow. The constructional unit therefore forms a type of cartridge which is fitted into the chamber of the valve housing. This simple task cannot lead to mounting errors.

In a further development of the invention, it is provided that the housing of the working element is provided with a collar forming a valve slide for the inflow valve, which collar is inserted into the chamber of the valve housing into which the inlet and the outlet of the inflow lead which are axially offset with respect to one another. The inflow valve is therefore formed in a simple manner with the collar of the housing of the thermostatic working element and the edge of the inlet of the inflow which can be shut off by this collar acting as the valve slide.

Other objects, advantages and novel features of the present invention will become apparent from the following detailed description of the invention when considered in conjunction with the accompanying drawings.

DETAILED DESCRIPTION OF THE DRAWINGS

Figure 1:
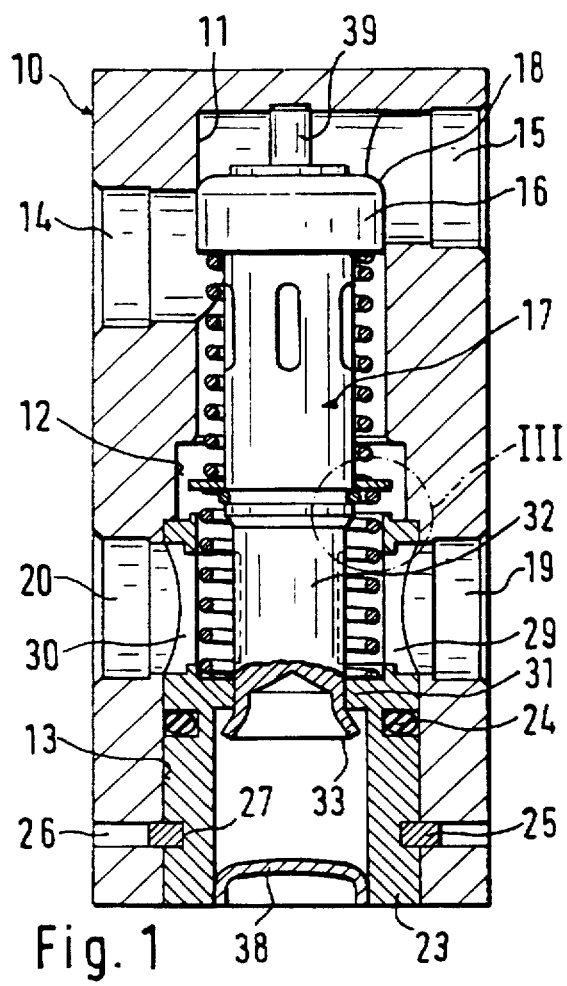
FIG. 1 is an axial sectional view of a thermostatic valve constructed according to a preferred embodiment of the invention.

The valve housing 10, which is illustrated in FIG. 1 and which may, for example, have a parallelpiped-shaped design, has a chamber which is open on one side and which is step-shaped into three cylindrical sections 11, 12, 13. An inlet 14 of an inflow leads into section 11, which inlet 14 is opposite an outlet 15 which, in the axial direction, is offset with respect to the inlet 14 in the axial direction toward the closed end of the chamber.

In section 11 of the chamber of the valve housing 10, a collar 16 of a housing 17 of a thermostatic working element is guided. The collar 16 of the housing 17 forms a valve slide for an inflow valve which, in the cold condition illustrated in FIG. 1, blocks the connection of the inflow between the inlet 14 and the outlet 15. The collar 16, which is provided with a control edge 18 assigned to the inlet 14, blocks the inlet 14 in the cold condition only about half so that the flowing medium can flow from the inlet 14 in a bypass flow to section 12 of the chamber.

Figure 3:
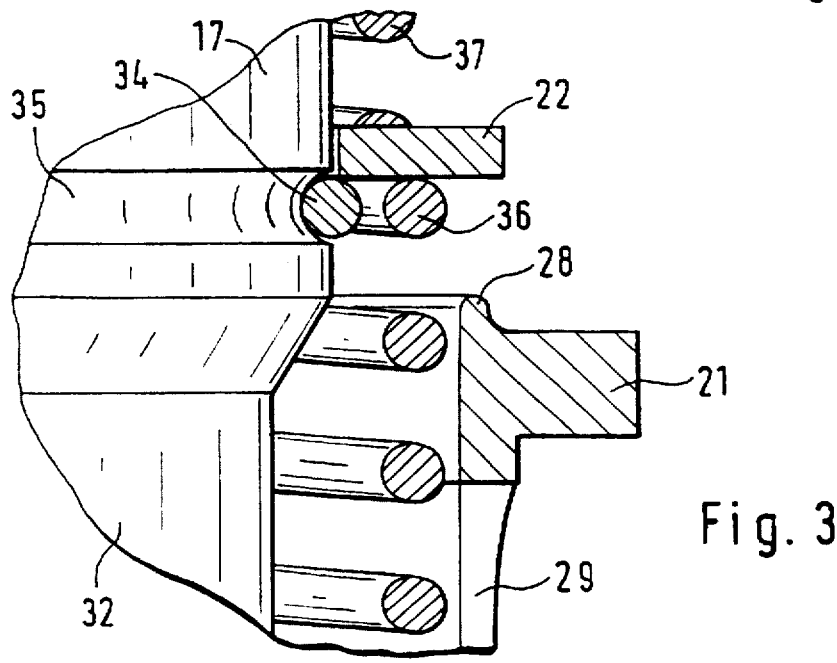
FIG. 3 is an enlarged partial sectional view of the detail III of FIG. 1.

Section 12 of the chamber, which is used as the bypass duct, can be blocked off by means of a bypass valve in the direction of a return flow which has an inlet 19 and outlet 20 and which is situated in section 13 of the chamber. The bypass valve contains a bypass valve seat 21 and a bypass valve disk 22 which are illustrated as an enlarged cutout in FIG. 3. The bypass valve seat 21 is molded to a holding part 23 which, from the direction of the open side, is fitted into section 13 of the chamber of the valve housing 10. The holding part 23 is provided with a ring groove into which a sealing ring 24, particularly an O-ring, is placed. The holding part 23 is secured in the valve housing 10 by means of a securing device 25 which is inserted into the valve housing 10 transversely to the inserting direction of the holding part 23 and engages in recesses 26 of the valve housing 10 and a surrounding recess 27 of the holding part 23 and therefore establishes a form-locking connection. Preferably, this securing device 25 is designed as a U-shaped bow-type spring which has a rectangular or possibly a round cross-section.

In the axial direction, the holding part inserted into section 13 is supported on the transition between section 13 and section 12 of the chamber which forms a step. In this area, the holding part forms the ring-shaped bypass valve seat 21 which is provided with the ring-shaped surrounding projection which is assigned to the valve seat 22.

Adjoining the valve seat 21, the holding element 23 is provided with bores 29, 30 which correspond to the inlet 19 and the outlet 20 of the return flow. In the area of the inlet 19 and of the outlet 20 of the return flow and the bores 29, 30 of the holding part 23, a surrounding annular chamber is provided so that the inlet 19 and the outlet 20 of the return flow are constantly connected with one another independently of the installed position of the holding part 23.

In the area of the valve seat 21 and of the bores 29, 30, the holding part 23 has a cylindrical shape. Behind the bores 29, 30, a transverse wall 31 is provided which has a central bore. In this central bore, a pin 32 of the housing 17 of the thermostatic working element is guided. The free end of the pin 32, which projects beyond the transverse wall 31, is provided with a bore and an edge which is flanged open toward the outside so that the moving path of the housing 17 is restricted.

The valve disk 22 consists of a ring disk which is axially slidably guided on the housing 17 of the thermostatic working element. The moving direction of the valve disk 22 in the direction away from the collar 16 is restricted by means of a securing ring 34 which is inserted into a ring groove 35 of the housing 17. A prestressed restoring spring 36 is applied to the valve disk 22; the other end of the restoring spring 36 being supported in the holding part 23, for example, on the transverse bottom 31. Opposite the restoring spring 36, an excess pressure spring 37 is applied to the valve disk 22; the other end of the excess pressure spring 37 being supported against the collar 16 of the housing 17. The excess pressure spring 37 is prestressed to a force which is clearly higher than the force to which the restoring spring 36 is prestressed. On its side facing away from the pin 32, the holding part 23 is tightly closed by means of a pressed-in lid 38.

In the housing 17 of the thermostatic working element, an expansion material, particularly a wax mixture, is situated which, at a predetermined temperature rise, changes its volume and in the process drives a working piston 39 out of the end of the housing 17 facing away from the pin 32. The construction of such a thermostatic working element, including of the devices for guiding the working piston and for sealing off the interior of the housing 17 is known in many ways from prior art. The closed end of section 11 of the chamber of the valve housing 10 is situated opposite the working piston 39.

Figure 2:
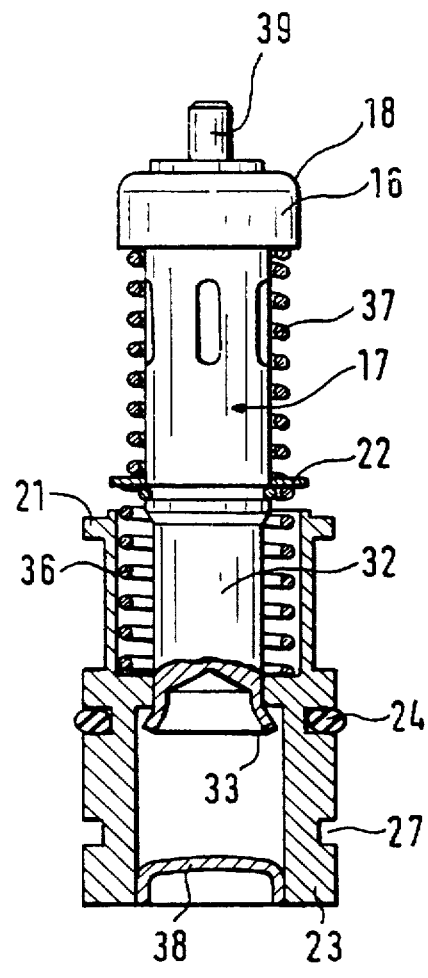
FIG. 2 is a sectional view rotated by 90° of a constructional unit which is constructed as an insert and which contains all essential operating elements of the thermostatic valve of FIG. 1.

As illustrated particularly in FIG. 2, the holding part 23 with the thermostatic working element 17, 39, the bypass valve seat 21, the bypass valve disk 22, the restoring spring 36 and the excess pressure spring 37 forms a preassembled constructional unit which can be marketed as such and which, during the final mounting of the thermostatic valve is inserted into the valve housing 10 and secured there.

The illustrated thermostatic valve is preferably arranged in the forward flow and the return flow between an automatic transmission of a vehicle and an oil cooler. The inlet 14 of the inflow and the outlet 20 of the return flow are connected to the automatic transmission and the outlet 15 of the inflow is connected to an oil cooler and the inlet 19 of the return flow is also connected to the oil cooler. As long as the flowing medium, particularly the transmission oil, is cold, the thermostatic valve remains in the condition illustrated in FIG. 1 in which the inflow valve between the inlet 14 and the outlet 15 of the inflow is closed, while the bypass valve is opened so that the arriving medium flows through the bypass valve to the return flow and from its outlet 20 back to the automatic transmission. Starting from a certain temperature of the oil, which can be determined by the selection of the wax mixture contained in the housing 17 of the thermostatic working element, the working piston 39 will move out. As the result, the housing 17 of the thermostatic working element is displaced. The connection between the inlet 14 and the outlet 15 of the inflow is opened up, while the bypass valve is closed. As illustrated in FIG. 1, the collar 16 used as the valve slide of the inflow valve and the inlet 14 are dimensioned such that when the bypass valve is already closed, the connection between the inflow and section 12 of the chamber of the valve housing is open so that the housing 17 is sufficiently exposed to the medium to be controlled. Should the temperature of the medium, particularly of the transmission oil, continue to rise after the bypass valve is already closed because the valve disk 22 comes to rest on the surrounding projection 28 of the valve seat 21, the working piston 39 can nevertheless continue to move out and displace the housing 17 further. This path is then taken up by the excess pressure spring 37.

The thermostatic valve illustrated in FIGS. 1 and 2 requires only a relatively small space. For reasons of a proper illustration, it is extremely enlarged. The natural size of the thermostatic valve is not quite half of that of the illustration.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Thermostatic valve comprising:

a thermostatic working element;

an inflow valve arranged in an inflow;

a bypass valve arranged in a bypass to a return flow, wherein said valve includes a preassembled constructional unit which can be inserted into a valve housing and which contains a thermostatic working element including a restoring spring, and movable valve elements, wherein the constructional unit has a holding part which can be inserted into the valve housing and in which a thermostatic working element housing is guided in an axially slidable manner which is provided with a valve element of the inflow valve and with a valve element of the bypass valve and, from its end facing away from the holding part, a working piston can be moved out, a support of the valve housing being situated opposite thereto, wherein the thermostatic working element housing is provided with a collar which forms a valve slide for the inflow valve and which is inserted into the chamber of the valve housing into which the inlet and the outlet of the inflow lead which are axially offset with respect to one another, wherein a bypass valve disk is arranged at a distance to the collar on the working element housing, a bypass valve seat being assigned to the bypass valve disk, and wherein the bypass valve seat is molded to the holding part.

2. Thermostatic valve according to claim 1, wherein the holding part is open toward the inlet and the outlet of the return flow on the side of the valve seat facing away from the bypass valve disk.

3. Thermostatic valve comprising:

a thermostatic working element;

an inflow valve arranged in an inflow;

a bypass valve arranged in a bypass to a return flow, wherein said valve includes a preassembled constructional unit which can be inserted into a valve housing and which contains a thermostatic working element including a restoring spring, and movable valve elements, wherein the constructional unit has a holding part which can be inserted into the valve housing and in which a thermostatic working element housing is guided in an axially slidable manner which is provided with a valve element of the inflow valve and with a valve element of the bypass valve and, from its end facing away from the holding part, a working piston can be moved out, a support of the valve housing being situated opposite thereto, and wherein the holding part is fastened in the valve housing by means of securing devices which extend transversely to the insertion direction of the constructional unit and engage in recesses of the valve housing and of the holding part.

4. Thermostatic valve according to claim 3, wherein the constructional unit can be inserted into a chamber of the valve housing, which is open on one side, the chamber walls being provided with essentially opposite inlets and outlets for an inflow and a return flow, between which a bypass is situated in which a housing of the thermostatic working element is arranged and which can be blocked with respect to the return flow by means of a bypass valve and with respect to the outlet of the inflow by means of an inflow valve.

5. Thermostatic valve according to claim 3, wherein a thermostatic working element housing is provided with a collar which forms a valve slide for the inflow valve and which is inserted into the chamber of the valve housing into which the inlet and the outlet of the inflow lead which are axially offset with respect to one another.

6. Thermostatic valve according to claim 5, wherein a bypass valve disk is arranged at a distance to the collar on the working element housing, a bypass valve seat being assigned to the bypass valve disk.

7. Thermostatic valve according to claim 3, wherein the housing of the working element is extended by means of a pin which engages in a guide bore of the holding part and which is secured by means of a securing device on the holding part against the operating direction of a restoring spring supported on the holding part and loading the thermostatic working element housing.

8. Thermostatic valve according to claim 7, wherein the pin reaches by means of a flanged-open edge behind an end of the guide bore of the holding part.

9. Thermostatic valve according to claim 3, wherein the holding part has an essentially cylindrical shape and is divided by a transverse wall which has a guide bore for a pin of the thermostatic working element housing.

10. Thermostatic valve according to claim 9, wherein the holding part is closed toward the outside by means of a lid.

11. Thermostatic valve according to claim 3, wherein said valve is configured to be disposed in the forward and return flow between an oil cooler and a vehicle automatic transmission.

12. Thermostatic valve comprising:
a thermostatic working element;
an inflow valve arranged in an inflow;
a bypass valve arranged in a bypass to a return flow,
wherein said valve includes a preassembled constructional unit which can be inserted into a valve housing and which contains a thermostatic working element including a restoring spring, and movable valve elements,
wherein the constructional unit has a holding part which can be inserted into the valve housing and in which a thermostatic working element housing is guided in an axially slidable manner which is provided with a valve element of the inflow valve and with a valve element of the bypass valve and, from its end facing away from the holding part, a working piston can be moved out, a support of the valve housing being situated opposite thereto,
wherein the thermostatic working element housing is provided with a collar which forms a valve slide for the inflow valve and which is inserted into the chamber of the valve housing into which the inlet and the outlet of the inflow lead which are axially offset with respect to one another, and wherein the pin reaches by means of a flanged-open edge behind an end of the guide bore of the holding part.

13. Thermostatic valve according to claim 12, wherein the housing of the working element is extended by means of a pin which engages in a guide bore of the holding part and which is secured by means of a securing device on the holding part against the operating direction of a restoring spring supported on the holding part and loading the thermostatic working element housing.

14. Thermostatic valve according to claim 13, wherein the pin reaches by means of a flanged-open edge behind an end of the guide bore of the holding part.

15. Thermostatic valve according to claim 12, wherein the holding part has an essentially cylindrical shape and is divided by a transverse wall which has a guide bore for a pin of the thermostatic working element housing.

16. Thermostatic valve according to claim 15, wherein the holding part is closed toward the outside by means of a lid.

17. Thermostatic valve according to claim 16, wherein the bypass valve disk is pressed by means of a pressure spring, which is supported on the collar of the working element housing, against a stop mounted on the working element housing.

18. Thermostatic valve according to claim 17, wherein the holding part is fastened in the valve housing by means of securing devices which extend transversely to the insertion direction of the constructional unit and engage in recesses of the valve housing and of the holding part.

19. Thermostatic valve according to claim 16, wherein a thermostatic working element housing is provided with a collar which forms a valve slide for the inflow valve and which is inserted into the chamber of the valve housing into which the inlet and the outlet of the inflow lead which are axially offset with respect to one another.

20. Thermostatic valve according to claim 19, wherein a bypass valve disk is arranged at a distance to the collar on the working element housing, a bypass valve seat being assigned to the bypass valve disk.

21. Thermostatic valve according to claim 17, wherein the holding part has an essentially cylindrical shape and is divided by a transverse wall which has a guide bore for a pin of the thermostatic working element housing.

22. Thermostatic valve according to claim 21, wherein the holding part is closed toward the outside by means of a lid.

23. Thermostatic valve comprising:
a thermostatic working element,
an inflow valve arranged in an inflow, and
a bypass valve arranged in a bypass to a return flow,
wherein said valve includes a preassembled constructional unit which can be inserted into a valve housing and which contains a thermostatic working element including a restoring spring, and movable valve elements;
wherein a thermostatic working element housing is provided with a collar which forms a valve slide for the inflow valve and which is inserted into the chamber of the valve housing into which the inlet and the outlet of the inflow lead which are axially offset with respect to one another;
wherein a bypass valve disk is arranged at a distance to the collar on the working element housing, a bypass valve seat being assigned to the bypass valve disk;
wherein the bypass valve disk is pressed by means of a pressure spring, which is supported on the collar of the working element housing against a stop mounted on the working element housing.

24. Thermostatic valve according to claim 23, wherein the holding part has an essentially cylindrical shape and is divided by a transverse wall which has a guide bore for a pin of the thermostatic working element housing.

25. Thermostatic valve according to claim 24, wherein the holding part is closed toward the outside by means of a lid.

* * * * *